United States Patent [19]

Shimada et al.

[11] 4,333,606
[45] Jun. 8, 1982

[54] AIR INTAKE CONTROL SYSTEM IN AIR CONDITIONING SYSTEM

[75] Inventors: Yukio Shimada; Naoyoshi Suzuki; Toshio Ohashi, all of Yokohama; Yasushi Inoshita, Tokyo, all of Japan

[73] Assignee: Nissan Motor Company, Limited, Kanagawa, Japan

[21] Appl. No.: 204,511

[22] Filed: Nov. 6, 1980

[30] Foreign Application Priority Data

Nov. 15, 1979 [JP] Japan ................................ 54-147066

[51] Int. Cl.³ .............................................. B60H 1/00
[52] U.S. Cl. ................... 237/12.3 A; 165/16; 236/13
[58] Field of Search ............... 236/13, 49, 82; 251/26; 165/25, 16; 237/12, 3 A

[56] References Cited
U.S. PATENT DOCUMENTS

| | | | |
|---|---|---|---|
| 3,428,115 | 2/1969 | Caldwell | 236/13 X |
| 3,455,505 | 7/1969 | Beatenbough et al. | 236/13 X |
| 3,718,281 | 2/1973 | Beatenbough et al. | 236/13 X |
| 3,983,930 | 10/1976 | Franz | 236/13 X |
| 4,037,651 | 7/1977 | Ito et al. | 236/82 X |
| 4,134,542 | 1/1979 | Sugiura | 236/13 |
| 4,240,580 | 12/1980 | Fehr | 236/49 |
| 4,262,738 | 4/1981 | Kato et al. | 165/25 |

Primary Examiner—William Tapolcai, Jr
Attorney, Agent, or Firm—Lane, Aitken, Kice & Kananen

[57] ABSTRACT

An intake control system comprising a mode selector which receives a first control pressure and a second control pressure, and, according to the temperature inside and outside the vehicle, adapted to supply selectively a plurality of different combinations of the first and second control pressures to a pressure activated actuator to switch an air intake system between at least an outside air position and a recirculating air position. An air intake changeover switch receives the pressure output by an air control switch, a first reference pressure and a second reference pressure, and supplies a certain combination thereof as the first and second control pressures, when operated, to the mode selector, thereby causing the actuator to switch the air intake system to the recirculating air position, irrespective of the switching state of the mode selector.

9 Claims, 2 Drawing Figures

AIR INTAKE CONTROL SYSTEM IN AIR CONDITIONING SYSTEM

BACKGROUND OF THE INVENTION

1. Field of the Invention

The present invention relates to the control of an air conditioning system for an automotive vehicle, and more specifically to an apparatus for controlling an air intake door, which in turn regulates the intake of air from outside the vehicle and of air recirculated within the vehicle. In particular the invention concerns an air intake door control system in which, under the control of a fully automatic temperature control device, the air intake door can be switched between positions in which outside air only is admitted, recirculated air only is admitted, or a mixture of outside and recirculated air is admitted; quite independently of the fully automatic temperature control device, however, it is arranged that if required, the air intake door can be forced into the position where only recirculated air is admitted.

2. Summary of the Prior Art

A typical conventional air conditioning system is provided inter alia with a temperature regulation means, a mode selector with settings such as "OFF", "AIR-CONDITIONER", "HEATER" and so forth, and a means for selecting the air intake from outside air, recirculated air or a mixture of the two. Automatic control systems are known, in which the selection between outside air, recirculated air or a mixture is carried out by an air intake door which is moved mechanically within the air intake passage by for example a vacuum actuator.

For example, the control of the air intake door has been carried out such that when a manually operated temperature control lever disposed within the vehicle passenger compartment is operated to select a desired temperature for the air to be outputted into the compartment a temperature signal is generated in an electric circuit. The circuit resistance includes, the combined resistance of an outside air temperature sensor, an inside air temperature sensor and a temperature setting potentiometer (set by the temperature control lever) connected in series. The temperature signal is fed to a differential amplifier whose output current causes a transducer to drive a vacuum power servomechanism to open or close an air mix door which controls the ratio of the amount of warm air to cold air outputted into the passenger compartment. According to the movement of the air mix door, the mode selector is automatically operated to select a desired control mode, such as "HEATER" to supply vacuum from a vacuum source through a manually operated selector which manually controls the supply of vacuum and atmospheric air to the air intake door vacuum actuator.

In the control system it is quite possible for there to be several other modes of operation in addition to those outlined above. These include the so-called "maximum cooling" mode in which only recirculated air, which is thus already substantially cooled, is used as intake to the air conditioner. Another such mode is a split level mode of operation in which cooled air is delivered to the windshield to defrost it, while warm air is delivered downward to the passenger compartment in order to warm the occupants' feet. In a special-purpose defrost mode, only outside air may be admitted, in order more quickly to clear the windshield. It will thus be readily apparent that the mechanism required, in terms of vacuum switching devices and the like, to operate the air intake door vacuum actuator is relatively complicated.

It is conventionally known to provide, either as part of the mode selector swich or separately, a switching means whereby an operator, which may be the driver, or possibly of course a passenger, may manually select outside air or recirculated air. In particular, there are occasions on which it is very desirable to be able to shut off rapidly the intake of outside air if the air outside the vehicle is suddenly undesirable. This will occur for example when the vehicle is passing a section of unsurfaced road which is dusty, or an agricultural installation, such as a pig farm, or factory, such as a chemical works, which gives off a generally unpleasant odor.

In a system with an automatic control as described earlier, therefore, it is no simple matter to provide a switch to cut off the intake of outside air, and commonly proposed conventional systems include for example electromagnetically operated valves in the pipes supplying vacuum to the air intake door vacuum actuator which are switched electrically to change the supply lines to the air intake door vacuum actuator to whichever state, vacuum or atmospheric pressure, and sets the air intake door in the position to admit only recirculated air. Since the air intake door normally has at least three positions, viz. outside air, recirculated air, and mixture, at least two supply lines are required to the air intake door vacuum actuator, and thus at least two electromagnetically operated valves are, of necessity, incorporated into the system. Such electromagnetically operated valves are expensive items, and this expense, together with the necessity for a controlling electrical circuit renders such a conventional system less than optimally desirable; it goes without saying that these are not the only drawbacks and that other factors such as the power consumed by electromagnetically operated valves will spring instantly to the minds of those acquainted with the art.

It is accordingly the object of the present invention to provide a new and improved system for controlling the air intake door which overcomes the problems of the above mentioned variety.

SUMMARY OF THE INVENTION

In an air conditioning system having an air intake system adapted to be switched between at least an outside air position and a recirculating air position, an air intake control system comprises a mode selector having two inlets which receives a first control pressure and a second control pressure, and, according to the temperatures inside and outside the vehicle, adapted to supply selectively a plurality of different combinations of the first and second control pressures to a pressure activated actuator adapted to switch the air intake system between its several positions.

The air intake control system further includes an air control switch which receives a first reference pressure source. The air control switch adapted to be operated manually, at a time of starting the system, and, when operated, supplies the first reference pressure when operated, to an air intake changeover switch. This air intake changeover switch further receives the first and a second reference pressure, in addition to the pressure output by the air control switch, and supplies a first combination, of the pressure output by the automatic air control switch, the first and second reference pressures, as the first and second control pressures when not operated, and a second combination, of the first and second reference pressures, as the first and second control pressure when operated. The second combination is such that irrespective of the switching state of the mode selector, the combination of the first and second control pressure supplied to the actuator is such that the actuator switches the air intake system to a recirculating air position.

BRIEF DESCRIPTION OF THE DRAWINGS

These and other objects, features and advantages of the present invention will be more clearly appreciated from the following description of a preferred embodiment thereof, taken in conjunction with the accompanying drawings in which like reference numerals designate corresponding elements, and in which.

DETAILED DESCRIPTION OF THE PREFERRED EMBODIMENT

Figure 1:
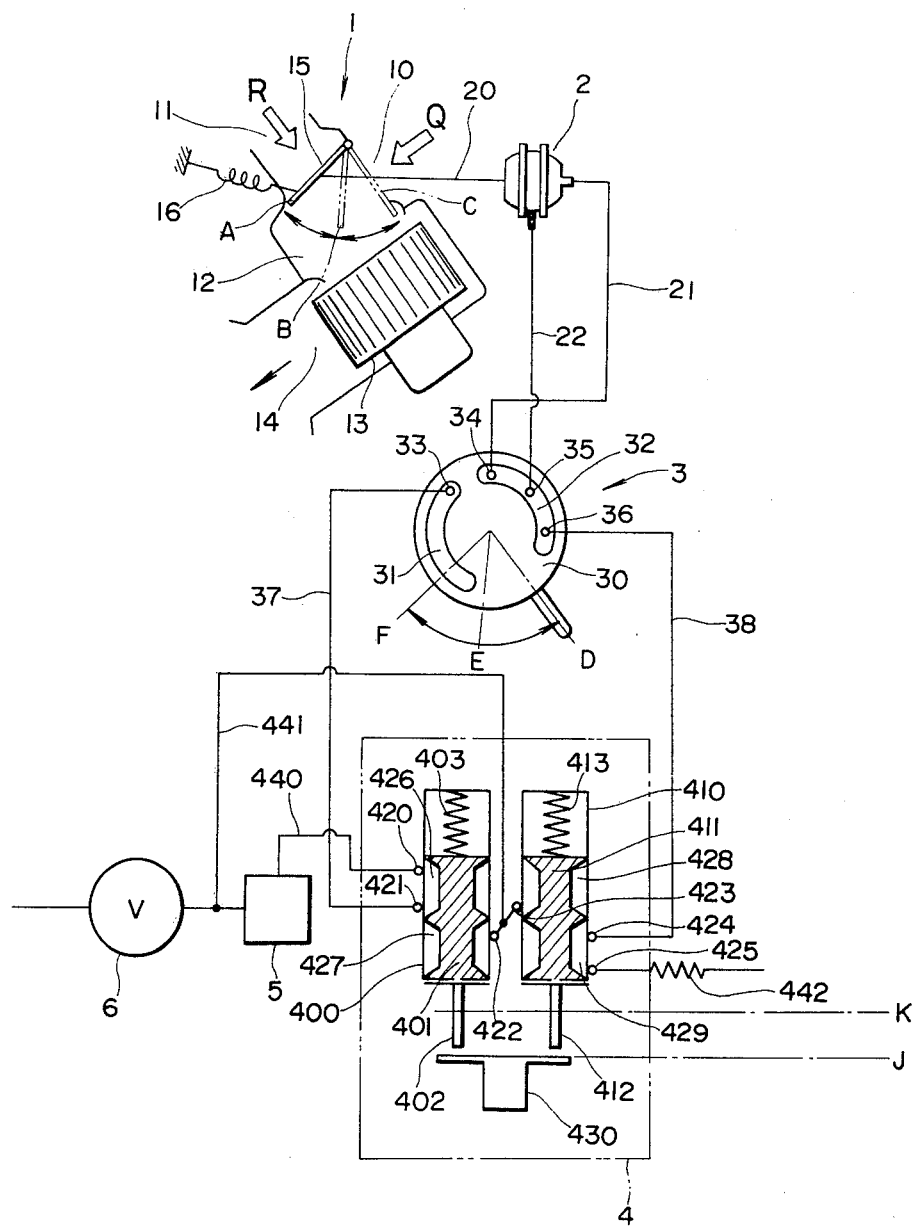
FIG. 1 is a schematic vacuum circuit diagram showing an air intake control system in an air conditioning control system wherein the air intake changeover switch is in an inoperative position.
Figure 2:
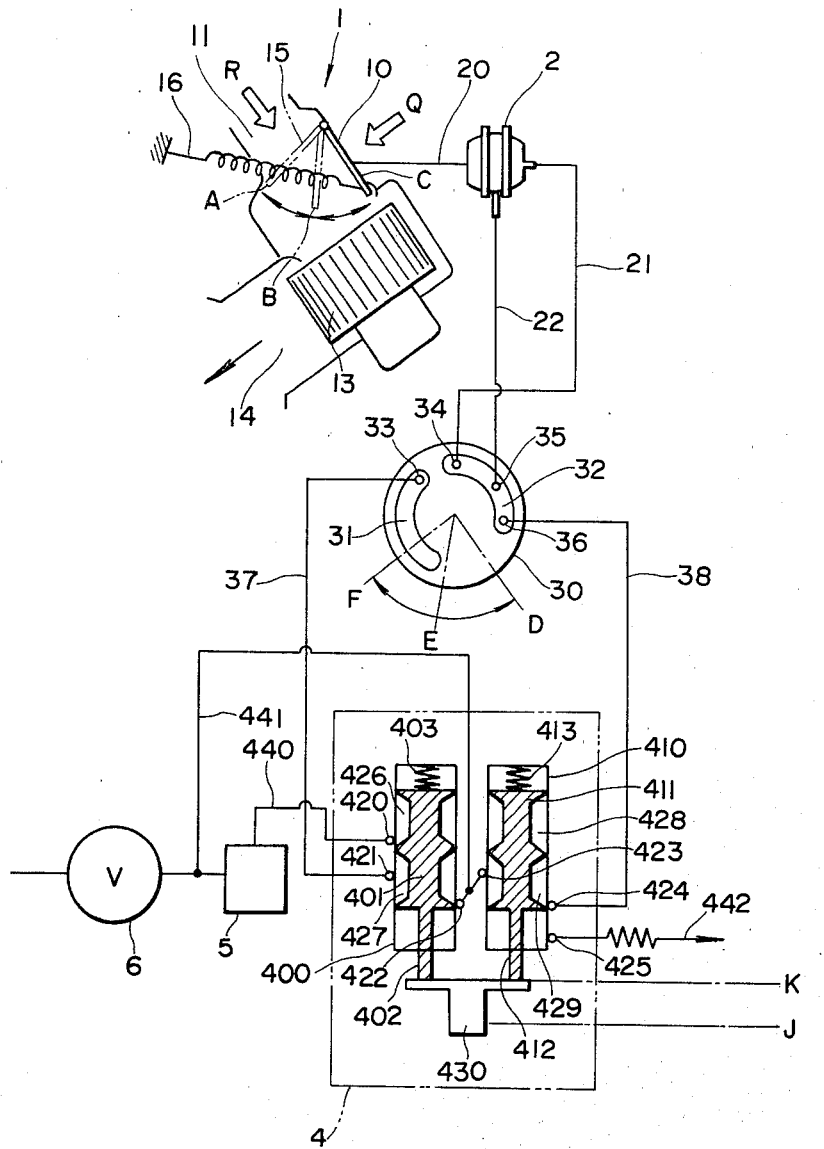
FIG. 2 is a schematic vacuum circuit diagram showing the air intake control system wherein the air intake changeover switch is in an operative position.

A preferred embodiment is shown in FIGS. 1 and 2 of the accompanying drawings in order to make clear a specific way in which the invention may be carried out.

FIG. 1 is a schematic vacuum circuit diagram showing a portion of a control system incorporating the present invention. Portions not shown in this figure may be of themselves conventional and will not require separate explanation.

In outline the system of this embodiment comprises an air intake system 1, a vacuum actuator 2, a mode selector 3 which functions as an air intake control valve, an air intake changeover switch 4, an air control switch 5, and a vacuum source 6. The air intake system is of a per se conventional type, in which a duct 10 admits outside air represented by arrow Q, and a duct 11 admits recirculated air from within the passenger compartment represented by arrow R to an inlet duct 12 of a fan 13. The fan 13 draws in air from the duct 12 and expels it through an outlet duct 14 to a heater and air conditioner not shown in the diagram. The control of air once it has entered the outlet duct 14 is carried out in a manner which is well known in the art, and thus for the sake of brevity further explanation is omitted here. The control of admission of air to the inlet duct 12, which is related to the present invention, is carried out by an air intake door 15 which is pivoted, in a well known way, so as to be able to move between positions indicated by A (solid line) and C (phantom line) in the diagram in which the recirculated air from duct 11 and the outside air from duct 10, respectively, are shut off. An intermediate position B shown by a phantom line, is a position of the air intake door 15 wherein a suitable mixture of outside and recirculated air is admitted. A tension return spring 16 is provided so as to bias the air intake door 15 to the left in the drawing so that if no other force is applied to the air intake door 15, the air intake door 15 will adopt position A. This return spring 16 is illustrated here in a purely schematic way, but its implementation will be apparent to those skilled in the art; in fact any well known method may be used to bias the air intake door 15.

Except for the effect of the return spring 16, the movement of the air intake door 15 is controlled by the vacuum actuator 2, through an associated mechanical linkage comprising a rod 20.

The vacuum actuator 2 is of an otherwise well known type capable of moving the actuating rod 20 into the three different positions. For this purpose, the vacuum actuator illustrated is in fact of a two-discharging type and has two separate vacuum control lines 21 and 22 connected thereto. With the type of vacuum actuator illustrated, if both lines 21 and 22 are supplied with atmospheric pressure, the vacuum actuator 2 is in the relaxed state, and the air intake door 15 adopts position A, because of the biasing effect of return spring 16. If a vacuum is supplied to both vacuum lines 21 and 22, the vacuum actuator 2 operates to pull the air intake door 15 fully to the right in the diagram, into position C. If, however, a vacuum is supplied to line 21, while line 22 is supplied with atmospheric pressure, then the vacuum actuator 2 operates to move the air intake door 15 just to the intermediate position B, so that a mixture of outside and recirculated air is drawn in by the fan 13.

The supply of vacuum or atmospheric pressure selectively to the two vacuum lines 21 and 22 is controlled by the mode selector 3, air intake changeover switch 4, and air control switch 5 in combination. First the structure of these portions will be described, and their functions explained later.

The mode selector 3 has a rotatable valve body 30 provided with transfer passages 31 and 32 which are capable of connecting selectively ports 33, 34, 35 and 36, provided in a non-rotating portion of the mode selector 3. The valve body 30 rotates, through an arc indicated in the drawing by the two extreme positions D and F and an intermediate position E, where the drawing shows the transfer passages 31 and 32 in their positions when the valve body 30 is in position D. It will be seen from the diagram that in this position the transfer passage 31 performs no connection function, but the transfer passage 32 connects together ports 34 and 35 and 36. When the valve body 30 is rotated (clockwise as seen in the drawing) from the illustrated position to that represented schematically as E, the transfer passage 31 will move round to connect ports 33 and 34, while transfer passage 32 will connect ports 35 and 36; there is of course no connection between the transfer passages 31 and 32 at this time. If the valve body 30 is then moved fully clockwise as seen in the drawing, in other words to the position indicated schematically by F, the transfer passage 31 will then connect together ports 33, 34 and 35, while the transfer passage 32 performs no connecting function.

A vacuum line 37 is provided connecting to port 33; a vacuum line 38 is provided connecting to port 36; and ports 34 and 35 are connected to vacuum lines 21 and 22 respectively.

The air intake changeover switch shown generally by the broken line frame enclosed portion 4 consists of a pair of similar spool type vacuum valves having bodies 400 and 410 respectively in which slide spool-shaped plungers 401 and 411, respectively, having operating rods 402 and 412 respectively projecting from their one ends. The plungers 401 and 411 are urged downward as seen in the drawing by compression coil springs 403 and 413 respectively disposed within the bodies 400 and 410 respectively.

In the valve body 400 are provided ports 420, 421 and 422, and in the valve body 410 are provided ports 423, 424 and 425. Valve member 401 has cavities 426 and 427 which are sealingly separated from each other, and valve member 411 has cavities 428 and 429 which are sealingly separated from each other. A common operating member 430 is provided, supported by means not shown in the diagram but per se of a well known type, so as to slide vertically as seen in the drawing between positions represented by broken lines J and K. Thus in FIG. 1, the operating member 430 is in its natural state in the position represented by line J. If, however, operating member is pressed upward in the drawing to the position represented schematically by line K, then the two valve members 401 and 411 are moved upward together against the resistance of the respective compression springs 403 and 413, as shown in FIG. 2. In the position of line J, ports 420 and 421 communicate through cavity 426, while port 422 is isolated, and ports 424 and 425 communicate through cavity 429 while port 423 is isolated. In the position of line K, however, ports 421 and 422 communicate through cavity 427 while port 420 is isolated, and ports 423 and 424 communicate through cavity 429, while port 425 is isolated. Of course, when the operating member 430 is in the position of line K, if the pressure is removed, it will be returned to the position of line J by the force of the compression springs 403 and 413.

Port 421 is connected to vacuum line 37, and port 424 is connected to vacuum line 38. A vacuum line 440 connects to port 420, and a vacuum line 441 has its one end connected in common to ports 422 and 423. A vacuum line 442 has one end connected to port 425 and the other end open to the atmosphere.

The end of vacuum line 440 remote from the air intake changeover switch 4 is connected to the outlet of the air control switch 5, and the inlet of the air control switch 5 and the end of vacuum line 441 remote from the air intake changeover switch 4 are together connected to the vacuum supply source 6.

The function of the system will now be described.

The air control switch 5 is operated by a driver or passenger to establish control of the air intake. The mode selector 3 is controlled by the system, in response to such factors as the temperatures inside and outside the vehicle and the temperature control setting, in a well-known manner as summarized in the Summary of the Prior Art. Thus the mode selector 3 is moved between positions D, E and F.

Considering first the case where the air intake control valve 4 is in its released position (line J), if the air control switch 5 is not operated, no vacuum can pass from the vacuum source 6 to vacuum line 440. Furthermore, the vacuum line 441 is supplying vacuum through ports 422 and 423 to cavities 427 and 428, respectively, but both of these cavities are isolated. Therefore, no vacuum is supplied to lines 37 or 38, and the air intake door 15 stays permanently in position A, whereby only outside air is admitted, irrespective of automatic control of the mode selector 3. If now, however, the air control switch 5 is operated, to supply a vacuum to vacuum line 440, which is supplied through cavity 426 to vacuum line 37, a vacuum is supplied to port 33. On the other hand, the vacuum supply through vacuum line 441 is isolated as explained above, and moreover the vacuum line 442 will ensure that the pressure in cavity 429 is atmospheric. This atmospheric pressure will be supplied through port 424, and vacuum line 38 to appear at port 36. Therefore in this position, the control of the mode selector 3 will result in changing the pressures supplied to ports 34 and 35, thereby selectively supplying a plurality of different groupings of the pressures to the vacuum actuator 2. It will be apparent from the connections recited above for the positions D, E and F of the mode selector 3, that in this state, for position D (actually that illustrated), atmospheric pressure is supplied to both ports 34 and 35, and thus through vacuum lines 21 and 22 to the vacuum actuator 2. Therefore the air intake door 15 will be in position A and only outside air will be admitted. If the mode selector 3 is moved to position E, vacuum will be supplied from port 33 through transfer passage 31 to port 34, whereas atmospheric pressure will be supplied from port 36 through transfer passage 32 to port 35. Therefore vacuum line 21 will supply vacuum but vacuum line 22 will supply atmospheric pressure to the vacuum actuator 2. Therefore as explained above, the air intake door 15 will be moved to position B, and a mixture of outside and recirculated air will be admitted. If the mode selector 3 is moved to position F, now vacuum will be supplied from port 33 through transfer passage 31 to both ports 34 and 35 and thus to both of vacuum lines 21 and 22. Therefore, as explained above, the vacuum actuator 2 will operate to move the air intake door 15 fully to the right in the drawing, to position C, whereupon only recirculated air from duct 11 will be admitted.

Next is considered the case when the air intake changeover switch 4 is operated. When air intake changeover switch 4 is pressed upward, as shown in FIG. 2, port 420 is isolated, and then it will be seen that the air control switch 5 has no effect. Furthermore, the vacuum supplied through vacuum line 441 to ports 422 and 423 is supplied through cavities 427 and 429 respectively, through ports 421 and 424 respectively and vacuum lines 37 and 38 respectively to ports 33 and 36 respectively. It will be seen that in this raised position of the air intake changeover switch 4, the connection through the line 442 to the atmosphere is cut off from cavity 429. A consideration of the above recited list of connections of the mode selector 3 will show that since a vacuum is supplied to both of ports 33 and 36, irrespective of the position of the valve body 30, connections are provided from either of the two ports 33 and 36 to both of ports 34 and 35 and thus, vacuum being supplied to both lines 21 and 22, the vacuum actuator 2 will operate to move the air intake door 15 fully to the right in the drawing, to position C, whereupon only recirculated air will be admitted from the duct 11.

Thus, the present invention provides a simple means for forcing the system to use only recirculated air irrespective of whether or not the air control switch is operated, and if so, irrespective of the control of intake air by the mode selector 3.

It will be clear that various modifications of the preferred embodiment illustrated are possible without deviating from the scope of the present invention. For example, the air intake changeover switch 4 is shown as having a pair of independent valve members (401 and 411) and associated ports and cavities, but it would be quite within the knowledge of one skilled in the relevant art to provide the same function by an equivalent single valve member with two independent set of cavities.

What is claimed is:

1. In an air conditioning system having an air intake system adapted to be switched between at least an outside air position and a recirculating air position, an air intake control system comprising:

(a) a pressure activated actuator adapted to switch said air intake system between said two positions;

(b) a mode selector having two inlets receiving a first control pressure and a second control pressure, and, adapted to supply selectively a plurality of different groupings of said first and second control pressures to said actuator;

(c) a first reference pressure source supplying a first reference pressure;

(d) a second reference pressure source supplying a second reference pressure;

(e) an air control switch receiving said first reference pressure source, adapted to output said first reference pressure when operated; and (f) an air intake changeover switch receiving input pressures including the first reference pressure from said air control switch, and said first and second reference pressures from said first and second reference pressure sources, and adapted, in a first position, to supply a first combination of said input pressures to said inlets of said mode selector; and adapted in a second position to supply a second combination of said input pressures to said inlets of said mode selector;

wherein said second combination is such that irrespective of the switching state of said mode selector, the groupings of said first and second control pressures supplied to said actuator is such that said actuator switches the air intake system to said recirculating air position.

2. The control system of claim 1 wherein said second reference pressure is atmospheric pressure.

3. The control system of claim 2 in which said first reference pressure is a substantial vacuum.

4. The control system of claim 3 in which said air intake system has at least a third position admitting a mixture of outside and recirculated air.

5. The control system of claim 4 in which said mode selector has two outlet means through which at least three different combinations of said first and second control pressures are supplied to said actuator.

6. The control system of claim 5 in which in said first position the air intake changeover switch supplies the same pressure as said first and second control pressures.

7. The control system of claim 6 in which the pressure supplied as both first and second control pressures when the air intake changeover switch is in said first position is the first reference pressure.

8. The control system of any of claims 1 to 6 and 9 in which said air intake changeover switch comprises two valve elements, wherein the first of said valve elements supplies the output of said air control switch as one of said mode selector inputs and the second of said valve elements supplies said second reference pressure as the other of said mode selector inputs when said air intake changeover switch is in said first position, and the first and second of said valve elements each supply said first reference pressure as said one and the other mode selector inputs when said air intake changeover switch is in said second position.

9. The control system of claim 8, wherein each of said two valve elements is a plunger type of valve.

* * * * *